United States Patent
Haynau et al.

(10) Patent No.: US 11,952,908 B2
(45) Date of Patent: Apr. 9, 2024

(54) TURBINE FOR A TURBOMACHINE, SUCH AS AN AEROPLANE TURBOFAN OR TURBOPROP ENGINE

(71) Applicant: SAFRAN AIRCRAFT ENGINES, Paris (FR)

(72) Inventors: Rémy Miled Michel Haynau, Moissy-Cramayel (FR); Arnaud Lasantha Genilier, Moissy-Cramayel (FR); Nicolas Contini, Moissy-Cramayel (FR); Maria Goossens, Moissy-Cramayel (FR); Benoit Guillaume Silet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/613,451

(22) PCT Filed: May 19, 2020

(86) PCT No.: PCT/FR2020/050834
§ 371 (c)(1),
(2) Date: Nov. 22, 2021

(87) PCT Pub. No.: WO2020/234542
PCT Pub. Date: Nov. 26, 2020

(65) Prior Publication Data
US 2022/0213810 A1   Jul. 7, 2022

(30) Foreign Application Priority Data

May 21, 2019   (FR) .................................. 1905340

(51) Int. Cl.
*F01D 25/24*   (2006.01)
*F01D 9/04*   (2006.01)

(52) U.S. Cl.
CPC ............ *F01D 25/246* (2013.01); *F01D 9/041* (2013.01); *F01D 9/042* (2013.01); *F05D 2260/231* (2013.01)

(58) Field of Classification Search
CPC ........ F01D 25/24; F01D 25/246; F01D 25/28; F01D 11/08; F01D 11/12; F01D 11/122;
(Continued)

(56) References Cited

U.S. PATENT DOCUMENTS 4,157,232 A * 6/1979 Bobo ........................ F02C 7/28
  415/199.5
8,961,117 B2 * 2/2015 Garin .................... F01D 11/005
  415/177

(Continued)

FOREIGN PATENT DOCUMENTS

EP   1533478 A2   5/2005
EP   3078814 A1   10/2016
(Continued)

OTHER PUBLICATIONS

International Patent Application No. PCT/FR2020/050834, International Search Report and Written Opinion dated Aug. 3, 2020, 8 pgs.
(Continued)

*Primary Examiner* — Elton K Wong
(74) *Attorney, Agent, or Firm* — Cozen O'Connor

(57) ABSTRACT

A turbine for a turbomachine includes an annular row (20) of moving blades (20a) surrounded by a support ring (26) of abradable material (24) carried by a housing (10). The turbine also includes a distributor (30) mounted downstream of the moving blades (20a) and having an attachment mechanism with a radially outer spoiler (38) coming to bear radially inwards on a cylindrical wall (12) connected to housing (10). An annular wall (14) extends radially inwards from the cylindrical wall (12) and engages at its radially
(Continued)

inner end in an annular groove (28) of the support ring (26), and in which a free annular space (40) is formed between a radially outer face (26*b*) of the ring (26) and the cylindrical wall (12).

13 Claims, 2 Drawing Sheets

(58) Field of Classification Search
CPC . F01D 9/04; F01D 9/041; F01D 9/042; F05D 2260/231
See application file for complete search history.

(56) References Cited

U.S. PATENT DOCUMENTS

| 2009/0246012 | A1 | 10/2009 | Shapiro | |
|---|---|---|---|---|
| 2016/0290157 | A1* | 10/2016 | Ning | F01D 9/065 |
| 2017/0002675 | A1* | 1/2017 | Lutjen | F01D 9/02 |
| 2018/0135433 | A1* | 5/2018 | Desforges | F01D 5/20 |

FOREIGN PATENT DOCUMENTS

| FR | 2961556 A1 | 12/2011 |
|---|---|---|
| FR | 3061741 A1 | 7/2018 |

OTHER PUBLICATIONS

French Application No. 1905340; Search Report dated Jan. 8, 2020; 2 pgs.

\* cited by examiner

TURBINE FOR A TURBOMACHINE, SUCH AS AN AEROPLANE TURBOFAN OR TURBOPROP ENGINE

CROSS-REFERENCE TO RELATED APPLICATIONS

This application is a 35 U.S.C. § 371 filing of International Application No. PCT/FR2020/050834 filed May 19, 2020, which claims the benefit of priority to French Patent Application No. 1905340 filed May 21, 2019, each of which is incorporated herein by reference in its entirety.

TECHNICAL FIELD

The present disclosure relates to turbines for a turbomachine, such as a turbojet or aircraft turboprop engine.

PRIOR ART

As shown in FIG. 1, a low-pressure turbine of a turbomachine comprises annular rows 20 of moving blades 20a arranged axially alternating with annular rows 30 of stationary blades 30a and surrounded by a low-pressure turbine housing 10. An annular row 20 of moving blades 20a and an annular row 30 of downstream stationary blades 30a together form a turbine stage. An annular row 30 of stationary blades 30a is also called a distributor. The distributor 30 is generally formed of a plurality of sectors arranged to be circumferentially abutting.

The radially outer end of each annular row 20 of moving blades 20a comprises tongues 22 which cooperate with an annularly shaped abradable material 24 carried by the radially inner face of a ring 26. The ring is generally formed from a plurality of ring sectors arranged to be circumferentially abutting. The ring 26 is made integral with the housing 10 thanks to a means of support carried by the housing 10 and a means of attachment of a downstream distributor 30 as seen in FIG. 2.

Typically, the means of support comprises a cylindrical wall 12 connected to the housing 10 and extending axially downstream. The cylindrical wall 12 has a radially inner annular face 12a and a radially outer annular face 12b.

The radially outer end of each annular row 30 of stationary blades 30a comprises an outer annular platform 32 carrying a means of attachment of the distributor 30. This means of attachment comprises an inner annular spoiler 34 extending upstream from the upstream end of the platform 32. In particular, the inner annular spoiler 34 has a radially outer annular face 34b. The means of attachment of the distributor 30 further comprises a frusto-conical wall 36 extending upstream and radially outwards from the outer annular platform 32. Lastly, the means of attachment comprises an outer annular spoiler 38 extending upstream from a radially outer end of the frusto-conical wall 36. The outer annular spoiler 38 has a radially inner face 38a.

The cylindrical wall 12 of the means of support is engaged in an annular groove 28 of a radially outer surface 26b of the ring 26. The upstream 28a and downstream 28c annular faces of the annular groove 28 form axial stops on the upstream and downstream ends of the cylindrical wall 12, thereby axially blocking the ring 26. The annular bottom face 28b of the annular groove 28 forms a radial abutment with the radially inner face 12a of the cylindrical wall 12, allowing radial attachment to the housing 10. The form-fitting cooperation between the cylindrical wall 12 and the annular groove 28 of the ring 26 also provides a seal by limiting an outflow of hot air from the primary-air annular vein.

The distributor 30 is positioned with respect to the housing 10 so that the radially inner annular face 38a of the outer annular spoiler 38 of the means of attachment comes to bear on the radially outer annular face 12b of the cylindrical wall 12 of the means of support. The distributor 30 is also held relative to the ring 26 by the radially outer annular face 34b of the inner annular spoiler 34 of the means of attachment coming to bear on the radially inner face 26a of the ring 26. A downstream end portion of the ring 26 is then engaged in an annular recess extending between the radially outer annular face 34b of the inner annular spoiler 34 and the radially inner annular face 38a of the outer annular spoiler 38. This annular housing is thus delimited by the radially inner annular face 38a of the outer annular spoiler 38, the outer annular face 34b of the inner annular spoiler 34 and an upstream face 36a of the frusto-conical wall 36.

When the turbine is in use, the hot pressurised gases exiting the combustion chamber cause the temperature of the stationary blades 30a, the moving blades 20a and the abradable material 24 to rise.

Heat conduction occurs radially outwards from the abradable material 24 to the ring 26 carrying the abradable material. The heat is then transferred to the cylindrical wall 12 of the housing 10 coming to bear on the ring 26 through contacts between an upstream face 12c of the cylindrical wall 12 and the upstream face 28a of the annular groove 28 of the ring 26, between the radially inner face 12a of the cylindrical wall 12 and the annular bottom face 28b of the groove 28 and between a downstream face 12d of the cylindrical wall 12 and the downstream face 28c of the groove 28. This leads to an increase in temperature by heat conduction of the housing 10 and the cylindrical wall 12 supporting the distributor 30.

The housing 10 and the means of support it comprises can thus reach a high temperature likely to embrittle them and reduce the life of the housing 10, a part that is very large and expensive to produce. It is therefore important to find technical solutions to limit the heating of the means of support of the housing.

SUMMARY OF THE INVENTION

The invention aims at providing a simple, efficient and cost-effective solution to these problems.

For this purpose, it proposes a turbine for a turbomachine comprising:

an annular row of moving blades surrounded by a support ring of abradable material carried by a housing, the ring defining a radially outer face, a distributor mounted downstream of said annular row of moving blades and comprising a means of attachment to a means of support of the housing, the said means of attachment comprising a radially outer spoiler coming to bear radially inwards on a radially outer annular face of a cylindrical wall of said means of support, the said means of support further comprising an annular wall extending radially inwards from the cylindrical wall and engaged at its radially inner end in an annular groove of the ring, and in which a free annular space is formed between a radially outer face of the ring and the cylindrical wall of the means of support.

The distance between the cylindrical wall and the abradable material, as described with reference to the prior art, is thus extended from the radial annular wall into the means of support and the free annular space. This allows the cylindrical wall of the means of support to be moved radially away from the radially outer face of the ring and reduces the amount of heat transmitted by heat conduction through the ring to the cylindrical wall of the means of support.

Furthermore, the formation of this free space 40 induces a radial elongation of the means of attachment of the distributor 30 due to the arrangement of the means of support. In this way, the cylindrical wall of the means of support is less hot and transfers less heat to the housing by thermal conduction than in the prior art.

In one embodiment, the abradable material support ring is carried by the housing via the means of attachment of the distributor.

According to another embodiment, the cylindrical wall of the means of support extends in an axial direction of the turbine, i.e. a direction parallel to the turbine axis.

The free annular space advantageously extends axially between the radial annular wall of the means of support and a frusto-conical wall of the means of attachment, this frusto-conical wall being connected at its radially outer end to the radially outer spoiler.

This delimitation of the free annular space implies that the annular wall of the means of support extends radially inwards from the upstream end of the cylindrical wall or from an intermediate position between the upstream and downstream end of the cylindrical wall. This allows the frusto-conical wall of the means of attachment to be axially distanced from the radial annular wall of the means of support so as to limit heat transfer between these two elements.

Advantageously, the radial annular wall of the means of support extends radially inwards from an upstream end of the cylindrical wall.

This configuration of the radial annular wall of the means of support gives the means of support a compact and simple design. This also allows the prior-art ring to be adapted by making a minor modification to the annular groove of the ring cooperating with the means of support. This configuration also allows a maximum axial distance between the truncated wall of the means of attachment and the radial annular wall of the means of support, minimizing heat transfer between these two elements.

The turbine may also have the feature that the free annular space defines a radial distance between the radially outer face of the ring and the cylindrical wall, which radial distance is at least twice a radial depth of the annular groove of the ring.

Thus, the radial gap between the radially outer surface of the ring and the cylindrical wall is large enough to limit heat transfer between these two elements.

In a further feature of the invention, the means of attachment of the distributor comprises a radially inner spoiler connected to the upstream end of a radially outer platform of the distributor, the radially inner spoiler coming to bear on a radially inner face of the abradable material support ring.

The distributor is thus held relative to the ring by the radially outer face of the radially inner spoiler coming to bear on the radially inner face of the ring. Furthermore, the invention makes extremely local geometric modifications compared to the prior art: the holding of the distributor in relation to the ring is not modified compared to the prior art. This makes it possible to keep the surrounding elements that are not related to the technical problem solved by the present invention without modification.

According to a preferred embodiment of the invention, the free annular space extends over an axial distance between the radial annular wall of the means of support and the frusto-conical wall of the means of attachment which is greater than an axial dimension of the cylindrical wall of the means of support.

According to another preferred embodiment of the invention, the free annular space extends over an axial distance between the radial annular wall of the means of support and the frusto-conical wall of the means of attachment which is greater than an axial dimension of the radially outer spoiler of the means of attachment.

These features may be considered together or alternatively and advantageously with the aim of maximising the axial dimension of the free annular space so that the axial spacing between the frusto-conical wall of the means of attachment and the annular wall radially inwards of the means of support is sufficient to limit heat transfer from the frusto-conical wall of the means of attachment to the cylindrical wall and the annular wall inwardly of the means of support.

In one embodiment of the invention, the turbine described above is a low-pressure turbine.

The invention also relates to a turbomachine such as a turbojet or an aircraft turboprop engine comprising a turbine as described above.

BRIEF DESCRIPTION OF THE DRAWINGS

Further features, details and benefits will emerge from reading the detailed description below, and from the analysis of the attached drawings, on which.

DESCRIPTION OF THE EMBODIMENTS

Figure 1:
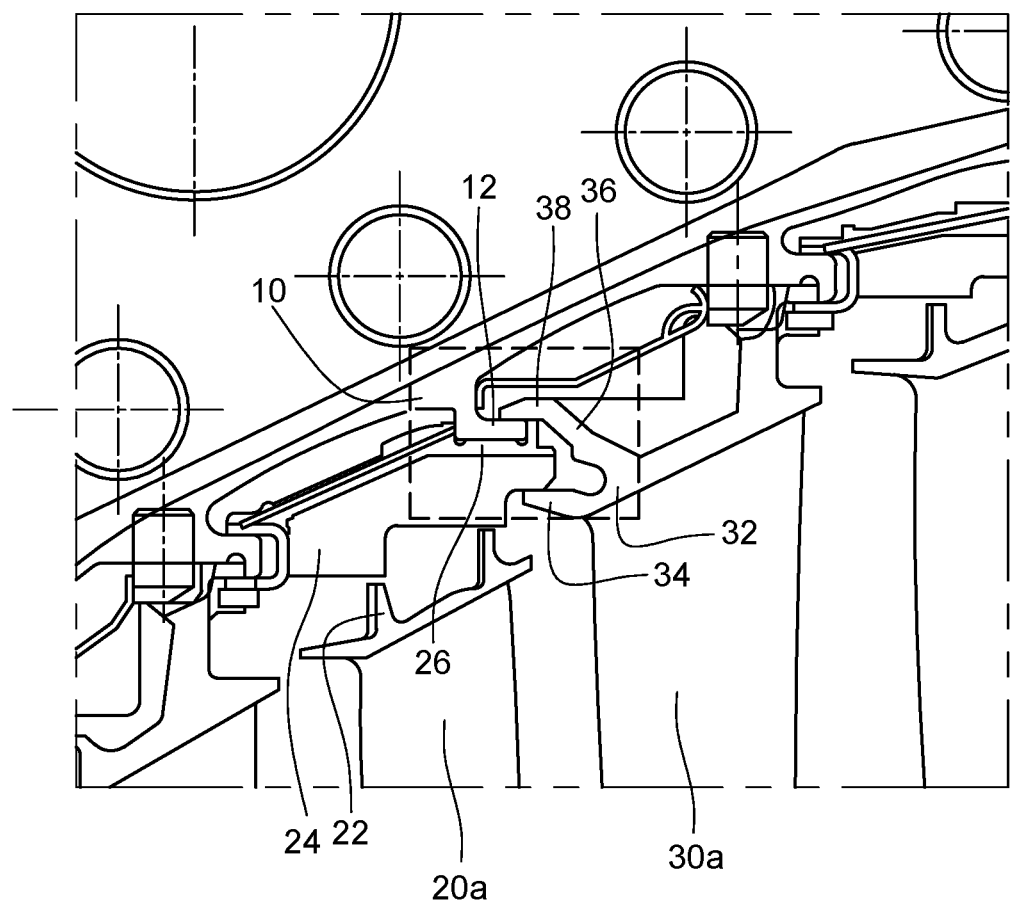
FIG. 1, already described above, shows a partial schematic half-view in axial section of a low-pressure turbine of the prior art.
Figure 2:
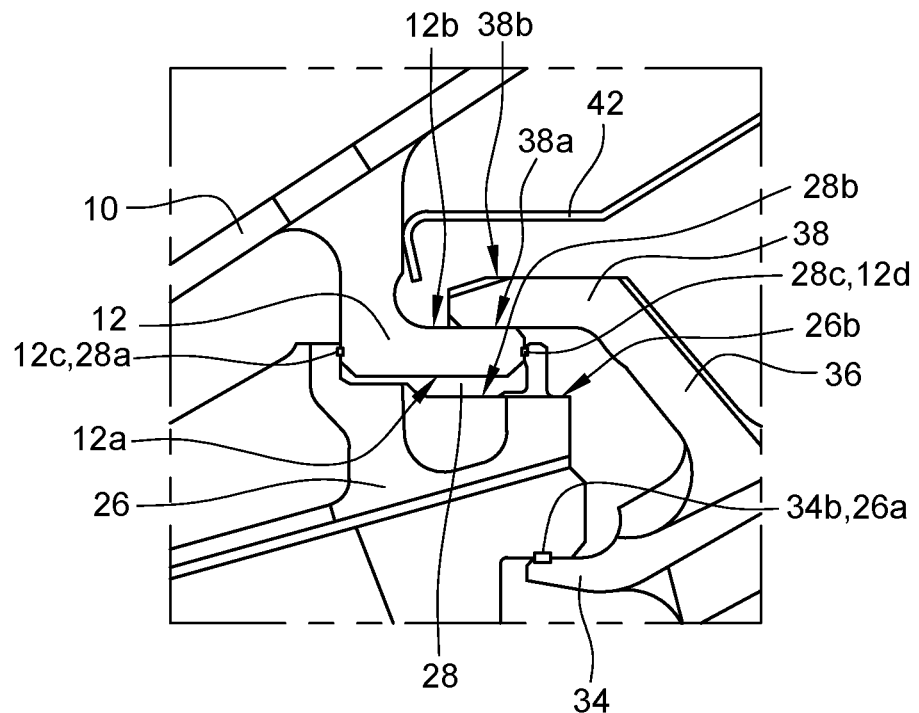
FIG. 2, already described above, is a larger scale schematic view of the zone outlined in dotted lines in FIG. 1.
Figure 3:
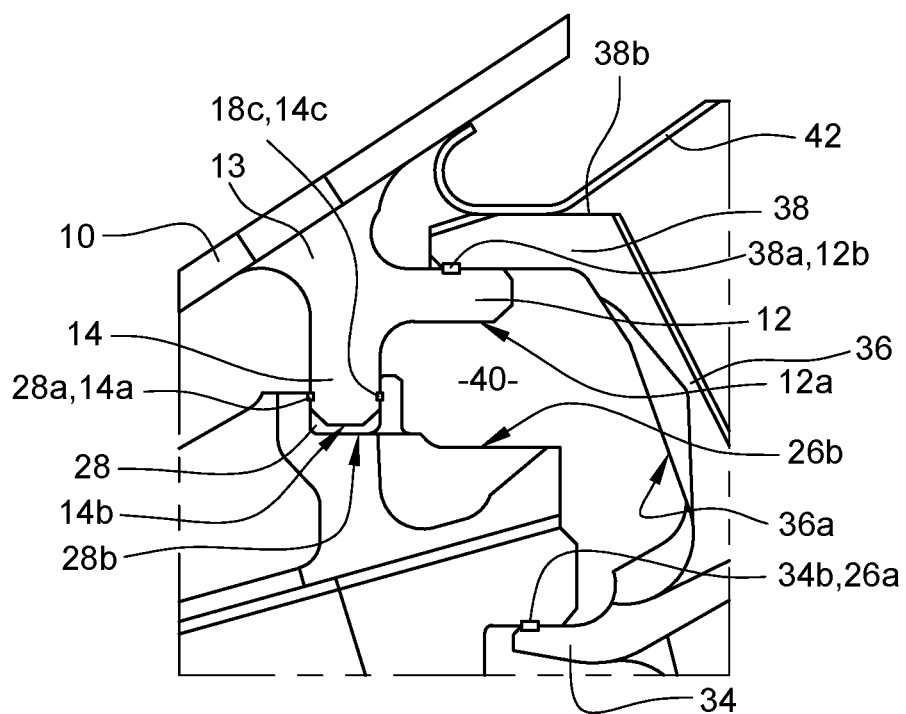
FIG. 3 is a schematic view similar to FIG. 2 illustrating an embodiment of the invention.

A turbomachine turbine according to a preferred embodiment of the invention is shown in FIG. 3 and comprises annular rows 20 of moving blades 20*a* arranged axially alternating with annular rows 30 of stationary blades 30*a*, also known as blades, said annular rows 20 of moving blades 20*a* and the annular rows 30 of stationary blades 30*a* being surrounded by a low-pressure turbine housing 10. The term "ring" as used herein refers to circumferentially extending parts, which parts may be in the form of a ring or ring sectors arranged to be circumferentially abutting. For example, the distributor 30 may be formed from a plurality of sectors arranged to be circumferentially abutting.

In a manner similar to the prior art, the radially outer end of each annular row 20 of moving blades 20*a* comprises tongues 22 sealingly engaging an annularly shaped abradable material 24 carried by the radially inner face 26*a* of a ring 26. The ring 26 is preferably sectorised, i.e. formed from a plurality of ring sectors arranged to be circumferentially abutting. The abradable material 24 support ring 26 is made integral with the housing 10 thanks to a means of support carried by the housing 10 and a means for attaching a downstream distributor 30 to the housing 10.

The means of support comprises a cylindrical wall 12 connected to the housing 10 and extending axially downstream. The cylindrical wall 12 has a radially inner annular face 12*a* and a radially outer annular face 12*b*. The means of support further comprises an annular wall 14 extending radially inwards from the cylindrical wall 12. In a preferred embodiment of the invention as shown in FIG. 3, the annular wall 14 extends radially inwards from an upstream end of the cylindrical wall 12 of the means of support. The radially inner end of the radial annular wall 14 engages in an annular groove 28 of the ring 26. In the example shown in FIG. 3, the means of support has a general "L" shape with two legs formed by the cylindrical wall 12 and the radial annular wall 14, or a general "T" shape formed by the cylindrical wall 12, the annular wall 14 and considering a connection 13 to the housing.

The radially outer annular face 26b of the ring 26 comprises a radially outwardly directed annular groove 28 in which the radially inner end of the radial annular wall 14 of the means of support is engaged. This annular groove 28 comprises an upstream annular face 28a and a downstream annular face 28c forming axial stops on the upstream face 14a and the downstream face 14c of the radially inner end of the radial annular wall 14 of the means of support, thereby axially blocking the ring 26. The annular bottom face 28b of the annular groove 28 forms a radial abutment with the cylindrical face 14b of the radially inner end of the radial annular wall 14, limiting the radially outward movement of the ring 26 relative to the housing 10. The form-fitting cooperation between the radial ring wall 14 and the annular groove 28 of the ring 26 also seals off the hot air in the vein.

The heat transmitted radially outward from the ring 26 to the means of support is first transmitted through the radial annular wall 14 before being received by the cylindrical wall 12 due to the "T" shape of the means of support which ensures that the cylindrical wall 12 is radially spaced from the ring 26. The amount of heat received by the cylindrical wall 12 from the ring 26 is therefore reduced.

The inner end of the radial annular wall 14 engaged in the annular groove 28 of the ring 26 has an axial dimension which is smaller than the axial dimension of the cylindrical wall 12 engaged in the annular groove 28 in the case of the turbine of the prior art. This results in a decrease in the radial bearing surface between the ring 26 and the means of support. Heat exchanges take place between the ring 26 and the means of support through the bearing surfaces. This reduction in the bearing surface between the ring 26 and the means of support therefore promotes a reduction in heat exchange between the ring 26 and the means of support.

This reduction in the axial dimension of the annular groove 28 results in a reduction in the clamping loss of the ring 26 in operation at the supports between the upstream face 14a of the annular wall 14 and the upstream annular face 28a of the annular groove 28 and between the downstream face 14b of the annular wall 14 and the downstream face 28c of the annular groove 28. This results in a reduction in stresses, thus improving the low cycle fatigue life of the ring 26.

The radially outer end of each annular row of stationary blades 30a comprises an outer annular platform 32 comprising a means of attachment of the distributor 30 to the means of support of the housing 10 and a means of attachment to the support ring 26 of the abradable material support 24. This means of attachment comprises a spoiler or an inner annual lug 34 extending upstream from the upstream end of the platform 32. In the case of a distributor formed of a plurality of sectors, each sector comprises an inner spoiler. In particular, the inner annular spoiler 34 has a radially outer annular face 34b. The means of attachment of the distributor 30 further comprises a frusto-conical wall 36 extending upstream and radially outwards from the outer annular platform 32. In other words, the frusto-conical wall 36 has a cross-section contained in an axial plane which increases in an upstream direction. Finally, the means of attachment comprises a spoiler or an outer annular lug 38 extending upstream from an outer radial end of the frusto-conical wall 36. In the case of a distributor formed of a plurality of sectors, each sector comprises an outer spoiler. In particular, the outer annular spoiler 38 has a radially inner annular face 38a.

The distributor 30 is positioned with respect to the housing 10 so that the radially inner annular face 38a of the outer annular spoiler 38 of the means of attachment rests on the radially outer annular face 12b of the cylindrical wall 12 of the means of support. The distributor 30 is also held relative to the ring 26 by the radially outer annular face 34b of the inner annular spoiler 34 of the means of attachment coming to bear on the radially inner face 26a of the ring 26.

A free annular space 40 is formed between the cylindrical wall 12 of the means of support and a radially outer face 26b of the ring 26. The free annular space 40 is devoid of any solid heat-conducting elements, including any fasteners. In this way, the radially inner face 12a of the cylindrical wall 12 is arranged directly opposite the radially outer face 26b of the ring 26. The free annular space 40 extends radially between the radially outer face 26b of the ring 26 and the radially inner annular face 12a of the cylindrical wall 12. The radial distance between the outer face 26b of the ring 26 and the radially inner annular face 12a of the cylindrical wall 12 is at least greater than a radial depth of the annular groove 28 of the ring 26. Advantageously, the radial distance between the outer face 26b of the ring 26 and the radially inner annular face 12a of the cylindrical wall 12 is at least twice the radial depth of the annular groove 28 of the ring 26. The cylindrical wall 12 of the means of support is thus radially distanced from the radially outer face 26b of the ring 26 compared to the prior art.

As shown in FIG. 3, the free annular space 40 may extend axially between the radial annular wall 14 of the means of support and the frusto-conical wall 36 of the means of attachment. To this end, the radial annular wall 14 of the means of support may extend from the upstream end of the cylindrical wall 12 or from an intermediate position between the upstream end and the downstream end of the cylindrical wall 12. This allows the radial annular wall 14 and the frusto-conical wall 36 to be moved axially away from each other, thus limiting the heat transfer between them.

The annular space is thus delimited radially by the radially outer face 26b of the ring 26 and the radially inner face 12a of the cylindrical wall 12 and it is delimited axially by the upstream face 14c of the radial annular wall 14 and the upstream face 36a of the frusto-conical wall 36 of the means of attachment. The annular space contains a volume of hot air whose flow is considered static. This reduces heat exchange by thermal convection by reducing the heat exchange coefficients between the hot air contained in the annular space 40 with the radially inner face 12a of the cylindrical wall 12, the downstream face 14c of the radial annular wall 14 of the means of support, the radially outer face 26b of the ring 26 and the radially inner face 38a of the outer annular spoiler 38 of the means of attachment.

In the practical embodiment shown in FIG. 3, the radial annular wall 14 extends from the upstream end of the cylindrical wall 12 so that the axial distance between the radial annular wall 14 and the frusto-conical wall 36 is maximised, minimising heat transfer between these elements.

According to a preferred embodiment of the invention, an axial distance between the radial annular wall 14 of the means of support and the frusto-conical wall 36 of the means of attachment is chosen which is greater than the axial dimension of the cylindrical wall 12.

According to another preferred embodiment of the invention, which may be independent of or associated with the preceding one, an axial distance is chosen between the radial annular wall 14 of the means of support and the frusto-conical wall 36 of the means of attachment which is greater than an axial dimension of the outer annular spoiler 38 of the means of attachment.

These two preferred embodiments of the invention allow sufficient axial spacing between the radial annular wall 14 and the frusto-conical wall 36 to optimally limit heat transfer between these two elements.

The presence of the free annular space 40 also implies that the radial distance between the radially inner face 26a of the ring 26 and the radially outer annular face 12b of the cylindrical wall 12 is greater than the same axial distance between these same two faces of the prior art. Thus, the radial dimension of the frusto-conical wall 36 is increased compared to the prior art to increase the radial spacing between the inner annular spoiler 34 and the outer annular spoiler 38. In this way, the supports of the means of attachment of the distributor 30 on the means of support and on the ring 26 are advantageously maintained.

A thermal protection sheet 42 is positioned between the outer annular spoiler 38 of the means of support and the housing 10. The sheet is at least held against a radially outer face 38b of the outer annular spoiler 38. This sheet reduces heat transfer from the outer annular spoiler 38 to the housing 10.

Heat conduction takes place radially outwards from the abradable material 24 heated by the hot gases flowing through the vein to the ring 26 supporting it. The heat is then transferred to the radial annular wall 14 of the means of support which is in contact with the ring 26 by the following points of contact, namely the contact between the upstream face 14a of the radial annular wall 14 and the upstream face 28a of the groove, the contact between the radially inner face 14b of the radial annular wall 14 and the bottom face 28b of the groove and the contact between the downstream face 14c of the radial annular wall 14 and the downstream face 28c of the groove. The radial annular wall 14 finally transfers the heat to the cylindrical wall 12 of the means of support and to the housing 10. As a result, the distance between the abradable material 24 and the cylindrical wall 12 is lengthened by the radial annular wall 14 compared to the prior art, which limits the amount of heat received by the cylindrical wall 12 from the means of support.

The free annular space 40 formed between the cylindrical wall 12 of the means of support and the ring 26 also makes it possible to limit the heat flow transmitted by the ring 26 to the cylindrical wall 12 of the means of support in that air is a less good thermal conductor than the metal parts generally constituting the various elements of the turbine and the housing 10.

Due to these effects, the cylindrical wall 12 of the means of support receives less heat and is therefore less hot. This increases the life of the housing 10 and the cylinder wall 12 and reduces maintenance costs.

The invention claimed is:

1. A turbine for a turbomachine comprising:
   an annular row (20) of moving blades (20a) surrounded by a support ring (26) of an abradable material (24) carried by a housing (10), the ring (26) defining a radially outer face (26b),
   a distributor (30) mounted downstream of the said annular row (20) of moving blades (20a) and comprising a means of attachment to a means of support of the housing (10), the said means of attachment comprising a radially outer spoiler (38) coming to bear radially inwards on a radially outer annular face (12b) of a cylindrical wall of said means of support, the said means of support further comprising a radial annular wall (14) extending radially inwards from the cylindrical wall (12) and the radial annular wall comprising a radially inner end engaged in an annular groove (28) of the ring (26), and in which a free annular space (40) is formed between the radially outer face (26b) of the ring (26) and the cylindrical wall (12) of the means of support,
   in which the means of attachment of the distributor (30) comprises a radially inner spoiler (34) connected to the upstream end of a radially outer platform (32) of the distributor (30), the radially inner spoiler (34) coming to bear on a radially inner face (26a) of the support ring (26) of abradable material (24).

2. The turbine according to claim 1, wherein the free annular space (40) extends axially between the radial annular wall (14) of the means of support and a frusto-conical wall (36) of the means of attachment, this frusto-conical wall (36) comprising a radially outer end connected to the radially outer spoiler (38).

3. The turbine according to claim 2, wherein the free annular space (40) extends over an axial distance between the radial annular wall (14) of the means of support and the frusto-conical wall (36) of the means of attachment which is greater than an axial dimension of the cylindrical wall (12) of the means of support.

4. The turbine according to claim 2, wherein the free annular space (40) extends over an axial distance between the radial annular wall (14) of the means of support and the frusto-conical wall (36) of the means of attachment which is greater than an axial dimension of the radially outer spoiler (38) of the means of attachment.

5. The turbine according to claim 1, wherein the radial annular wall (14) of the means of support extends radially inwards from an upstream end of the cylindrical wall (12).

6. The turbine according to claim 1, wherein the free annular space (40) defines a radial distance between the radially outer face (26b) of the ring (26) and the cylindrical wall (12), which radial distance is at least greater than twice a radial depth of the annular groove (28) of the ring (26).

7. A turbine according to claim 1, the turbine being a low-pressure turbine.

8. The turbine according to claim 7, wherein the free annular space (40) extends axially between the radial annular wall (14) of the means of support and a frusto-conical wall (36) of the means of attachment, this frusto-conical wall (36) comprising a radially outer end connected to the radially outer spoiler (38).

9. The turbine according to claim 8 wherein the free annular space (40) extends over an axial distance between the radial annular wall (14) of the means of support and the frusto-conical wall (36) of the means of attachment which is greater than an axial dimension of the cylindrical wall (12) of the means of support.

10. The turbine according to claim 8, wherein the free annular space (40) extends over an axial distance between the radial annular wall (14) of the means of support and the frusto-conical wall (36) of the means of attachment which is greater than an axial dimension of the radially outer spoiler (38) of the means of attachment.

11. The turbine according to claim 7, wherein the radial annular wall (14) of the means of support extends radially inwards from an upstream end of the cylindrical wall (12).

12. The turbine according to claim 7, wherein the free annular space (40) defines a radial distance between the radially outer face (26b) of the ring (26) and the cylindrical wall (12), which radial distance is at least greater than twice a radial depth of the annular groove (28) of the ring (26).

13. A turbomachine comprising the turbine according to claim 1.

* * * * *